United States Patent Office 3,317,396
Patented May 2, 1967

3,317,396
COMPOSITION AND METHOD FOR INHIBITING CALCULUS DEPOSITION ON HUMAN TEETH
Istvan Tamas, 4967 S. Sedgewick, Road, Lyndhurst, Ohio 44124
No Drawing. Filed Sept. 3, 1965, Ser. No. 485,073
17 Claims. (Cl. 167—93)

This application in a continuation-in-part of my copending application Ser. No. 378,052, filed on or about June 25, 1964, now abandoned.

The invention of this application relates to anticalculus compositions and is particularly concerned with new compositions which are effective in inhibiting the deposition of calculus on human teeth and with a new method of inhibiting such calculus depositions.

In my Patent No. 3,120,469 issued on Feb. 4, 1964, I disclosed an anticalculus composition which included a dentifrice and an organic titanate combined with an organopolysiloxane. That composition has been found to be particularly useful in inhibiting salivary calculus (tartar) formations on natural or artificial teeth.

I have now discovered that comparable results may be obtained by means of an anticalculus composition which consists essentially of the reaction product of an organic titanate and a substance having a carboxylic acid radical and which may include a toothpaste and also a fluoro carbon resin. When such a composition is properly made and is brushed or rubbed onto natural or artificial teeth, a very thin film is deposited on, and adhere to, the teeth for a considerable length of time after brushing. This film effectively inhibits the deposition of calculus on the teeth.

If desired, a polishing agent may be incorporated in the said anticalculus composition, to remove stains, pellicle films, tars and food debris from the teeth during brushing. Such agent will expose clear surfaces of the teeth to the said compound which will form the said thin film on the teeth.

There are several classes of titanium compounds which may be used in making compositions embodying the present invention. One class comprises derivates of titanium ortho esters having the formula $Ti(OR)_4$ in which R represents an alkyl group. Examples of this class are tetra isopropyl titanate, tetra-N-butyl titanate, and tetra octylene glycol titanate. Another class is that of titanium chelates which include amino compounds such as water or alcohol soluble alkanol amine titanate. Examples of this class are triethanolamine titanate, triethanolamine titanate-N-oleate, and triethanolamine titanate-N-stearate.

There are numerous water or alchohol soluble organic compounds which may be reacted with any of the foregoing titanium compounds to produce reaction products embodying the present invention. These organic compounds are alkyl organic acids, salts and esters. Examples of such compounds are long chain type fatty acids, such as stearic acid, hydroxy acids such as lactic acid, ricinoleic acid, sodium salts of such long chain fatty acids, esters of said acids, and castor oil and its derivates including glycerol 12-hydroxy stearate which is known as castor wax or beeswax. These alkyl organic compounds may also be described as having carboxylic acid radicals. In the interest of brevity, the latter term is used herein in lieu of the longer term of alkyl organic acids, salts and esters.

Any of these organic compounds containing the carboxylic acid radical, that is carboxylic acids or carboxylates, may be reacted with any of the above described titanium compounds to produce anticalculus compounds embodying the present invention.

Castor oil is quite suitable for use with the above described titanates particularly those which are chelated compounds. Castor oil has a low acid value while certain of the chelates, for example, tariethanolamine titanate, are quite alkaline, having a pH of about 9. Hence, when castor oil is reacted with such a titanate the pH value of the resulting product is reduced to about 7.5 or to such an extent that it does not irritate the mucous membranes. This low acid value of castor oil is traceable in part to the several acids which constitute it including ricinoleic, linoleic and eicosanoic. In the event that the pH value of the titanate is not reduced sufficiently by the castor oil which is combined therewith, a suitable amount of acid, for example stearic acid, may be added to reduce the pH value to the desired value. An advantage traceable to the use of castor oil is that it causes considerable foaming of the dentifrice which is thought to assist in dislodging food particles from between the teeth.

Castor oil of the sulfonated variety, or the sodium salt of ricinoleic acid, is quite desirable for reaction with the organo titanates for the film deposited from the resultant compound on the teeth appears to have emulsifying and adhesive properties in addition to the property of inhibiting calculus deposits. Moreover, none of the foregoing ingredients of the compounds embodying the present invention is toxic and on allergic reactions have been observed from the use of such compounds and this is particularly true of castor oil and its derivates for they are recognized as being non-toxic.

Since castor oil and its derivates possess an oily taste, which may considered unpleasant by some people, I prefer to treat the castor oil or its derivates in such a way as to improve its taste. To that end the castor oil or its derivate is emulsified with a water soluble resin such as methyl cellulose, caroxby methyl cellulose, hydroxyethyl cellulose, carboxyl vinyl polymer (Carbopol) polyvinyl alcohol, or other non-toxic water or alcohol soluble polymers and cellulose gums. I have found that good results are obtained when a low or medium viscosity cellulose is blended with the active ingredients in amounts ranging from about 0.5 to about 3% of the composition.

When any of the foregoing titanium compounds are reacted with any of the foregoing carboxylic radical containing organic compounds, the resulting product has an alkaline or metallic taste. I have found that this taste may be substantially eliminated by reacting that compound with any of the just mentioned celluloses.

The present invention contemplates the use of the above described reaction products in emulsified form or mixed with a toothpaste dentifrice. The reaction products may be emulsified by use of any suitable emulsifying agent such as polyoxethylene, or water soluble viscouse gums or cellulose, for example, methyl cellulose and carboxy vinyl polymer (Carbopol).

The emulsified composition will be applied be being rubbed on the teeth and the toothpaste mixture may be applied with a brush. In either case a thin adherent film will be formed on the teeth where, for a considerable time, it will remain and inhibit the formation of calculus deposits on the teeth.

When it is desired that any of the foregoing anticalculus compositions should have the added property of polishing, any well known and suitable polishing substance may be incorporated in the anticalculus composition. Since most of such so-called polishing materials are actually abrasive, I prefer to use, as a polishing material, fluorocarbon resins of high or low molecular weight in the form of polymers, copolymers or homopolymers and, preferably, of low micron size.

Such resins are inert, have durometer hardnesses of from about 50 to 80 Shore, D Scale, absorb substantially no water, are substantially non-adherent to the teeth, have coefficient of sliding friction to steel in the region of about 0.14 to 0.17, have low surface tension and the particles have a variable degree of crystallinity depending on the manner of cooling from the molten condition. The molecular weight of these resins is preferably between about 300,000 and 600,000.

The low coefficient of friction assures against scratching of the teeth, the crystalline particles serve to remove the film on the teeth and the low surface tension assures that the titanate will be spread over the teeth. Also, these resins are non-reactive with the other ingredients of the composition. Ordinary polishing agents have particles averaging from about 30 to about 75 microns and have much higher coefficients of friction and scratch, groove and abrade the teeth. Preferably, the resins used in this invention range between about 0.02 and about 35 microns.

Examples of suitable fluoro carbon resins are as follows: polytetrafluoroethylene (TFE), polychlorotrifluoroethylene (CTFE), the copolymer of tetrafluoroethyl and hexafluoropropylene (FEP), polyvinyl fluoride (PVF), or the homopolymer of vinylidene fluoride (Kynar), and fluorinated vinyl resin.

The present invention includes the steps of reacting the selected titanate with the selected carboxylic acid radical containing substance, adjusting the pH value of the resulting composition and mixing it with the selected toothpaste to form a dentifrice which may be brushed onto the teeth in the ordinary manner, or emulsifying it and rubbing the emulsion on the teeth. When polishing action is desired, the above described polishing agent is added to said composition before it is emulsified or added to a toothpaste.

The present invention will be better understood by those skilled in the art from the following examples of suitable anticalculus compositions, it being understood that these examples are given for the purpose of disclosing the invention and not for the purpose of limiting it.

*Example I*

| | Gram or cc. |
|---|---|
| Triethanolamine titanate | 0.5 to 3.0 |
| Stearic acid, triple pressed (Emersol 132) | 0.5 to 3.0 |

In preparing an anticalculus composition from the foregoing substances, the stearic acid and triethanolamine are brought together and are heated while being stirred until the acid is completely melted. Heating at a temperature of from about 75° C. to about 95° C. is sufficient. The resulting composition may be diluted with ethanol while being stirred and the heating is continued until the solution is clear. The pH of the clear solution should be between about 7 and 7.5. Then, the solution is mixed with a toothpaste which preferably contains 1 to 5 cc. of sorbitol.

The structure of the composition which results when the stearic acid and the titanate are treated, as just described, may be shown as follows:

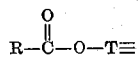

This reaction is typical of the reactions which take place in the following examples.

*Example II*

| | Gram or cc. |
|---|---|
| Palmitic acid | 1.0–3.0 |
| Ethyl alcohol | 3.0–5.0 |
| Triethanolamine titanate | 1–2.5 |

In preparing the composition from the substances of Example II, the procedure of Example I is followed.

*Example III*

| | Gram or cc. |
|---|---|
| Triethanolamine titanate | 2.0 |
| Anhydrous glacial acetic acid | 1.0 |
| Caster oil | 0.5–3.0 |
| Ethanol | 5.0 |

In preparing the composition from the substances of Example III, the titanate is neutralized by the addition of the acetic acid thereto while being stirred and heated at about 50° C. The castor oil is dissolved in the ethanol. Then the titanate and dissolved castor oil is blended, stirred and heated at about 70° C. until the resulting liquid is clear. Then about 0.5 cc. of PVP (polyvinul pyrrolidone) may be added while the stirring and heating continue. When the solution is clear, it may be added to a toothpaste or emulsified as described above.

*Example IV*

| | Gram or cc. |
|---|---|
| Triethanolamine titanate | 2.0–3.0 |
| Sodium ricinoleate | 0.5–4.0 |
| Distilled water | 2.0 |

The composition may be prepared from the substances of Example IV as follows: The titanate is dissolved in water and heated at about 50° C., the sodium ricinoleate is slowly added thereto. The stirring and heating are continued until the liquid is clear. Then 0.5 cc. of PVP and 10 cc. sorbitol may be added while the heating and stirring continue and, when the resulting solution is clear, it may be mixed with a toothpaste or emulsified.

*Example V*

| | Gram or cc. |
|---|---|
| Triethanolamine titanate | 2.0–3.0 |
| Stearic acid, triple pressed (Emersol 132) | 0.5–3.0 |
| Ethanol | 5.0–10.0 |
| Castor oil | 1.0–3.0 |

The composition may be made from the substances of Example V by dissolving the titanate in the ethanol while being stirred and heated at about 95° C. The stearic acid is added thereto and the stirring and heating are continued until the solution is clear. The castor oil is added to the clear solution and the heating and stirring are stopped when the solution is clear. Then it is mixed with the selected toothpaste or emulsified.

*Example VI*

| | Gram or cc. |
|---|---|
| Ricinoleic acid | 1 to 3 |
| Triethanolamine titanate | 1–2 |
| Ethanol | 5.0–7.0 |

The composition may be prepared from the substances of Example VI by bringing the titanate into the ethanol and heating at about 65° C. while stirring until the solution has become clear and then adding the ricinoleic acid and continuing the heating and stirring until the solution becomes clear. Then the solution may be emulsified or mixed with a toothpaste.

*Example VII*

| | Gram or cc. |
|---|---|
| Undecylic acid (N.F.) | 1–2 |
| Triethanolamine titanate | 1–2 |
| Ethanol | 5.0–7.0 |

The composition may be made from the substances of Example VII in substantially the same manner as just described in connection with Example VI.

*Example VIII*

| | Gram or cc. |
|---|---|
| Titanium acetyl acetonate | 1.0–3.0 |
| Acetic acid (10%) | 1.0 |
| Ethanol | 7.0 |
| Distilled water | 6.0 |
| Isotactic polypropylene resin powder | 25.0 |
| Dental cream | 54.0 |

In preparing the composition from the substances of Example VIII, the acetic acid is added to the acetonate and the ethanol is mixed with the water. Then these two mixtures are brought together and heated at a temperature of about 65° C. with stirring until the resulting composition is a clear liquid. Then the resin powder is mixed into the liquid by stirring while the heating continues and when the powder is substantially uniformly distributed in the liquid, the stirring and the heating are stopped and the resulting material is added to the dental cream with stirring or is emulsified.

Example IX

|  | Gram or cc. |
|---|---|
| Titanium lactate | 1.0–2.0 |
| Distilled water | 7.0 |
| Sodium ricinoleate | 0.5–4.0 |
| Methyl cellulose (50 cps.) | 0.5–1.0 |

These substances may be combined by heating and stirring substantially as described above in Example IV.

Example X

|  | Gram or cc. |
|---|---|
| Tetra octylene galycol titanate | 1.0–3.0 |
| Isostearic acid | 1.0–2.0 |
| Ethanol | 5–10 |

In preparing the anticalculus composition from the substances of this example, the titanate, acid and ethanol are mixed and are stirred while the mixture is being heated until it becomes clear which ocurs at a temperature of between about 75° C. and 95° C. The resulting composition may be mixed with a selected toothpaste or emulsified.

Example XI

|  | Gram or cc. |
|---|---|
| Tetra isopropyl titanate | 1.0–3.0 |
| Sodium ricinoleate | 1.0–2.0 |
| Acetic acid | 0.5–1.0 |
| Ethanol | 5–10 |

In preparing an anticalculus composition from the substances of this Example, the titanate is neutralized with the acetic acid and then the neutralized titanate, the ethanol and the sodium ricinoleate are mixed and heated to between about 75° C. and 100° C. until a clear liquid is formed. This liquid may then be emulsified or mixed with a selected toothpaste.

Example XII

|  | Gram or cc. |
|---|---|
| Isopropyl titanium stearate | 1.0–3.0 |
| Ricinoleic acid | 1.0–3.0 |

The stearate and acid of this example are mixed and melted and are heated to between about 75° C. and 100° C. until a clear liquid is formed.

Example XIII

|  | Gram or cc. |
|---|---|
| Triethanolamine titanate | 1.0–3.0 |
| Ethoxylated castor oil | 0.5–2.0 |
| Tetrafluoroethylene resin powder | 5.0–50.0 |
| Dental cream | 54.0 |

In preparing the composition from the substances of Example XIII, the titanate, castor oil, and distilled water are brought together and are heated and stirred until the solution is clear. The powdered resin is then added to the clear liquid and substantially uniformly distributed therein. Preferably, the resin particles range from about 0.02 micron to about 35 microns. The resulting material may be mixed with the selected dental cream or emulsified. If desired, other substances may be added to any of the foregoing anticalculus compositions, for example, polyvinyl pyrrolidone may be added not only to Example III, but to any of the compositions of the other examples, its primary purpose being to whiten the teeth.

Any of the foregoing anticalculus compositions may be used by being mixed in a toothpaste in a ratio of about 5% of the composition to about 95% of the toothpaste, or by being emulsified with any suitable emulsifying agent such as glyceryl monostearate or polyoxyethylene stearate, or with a water soluble viscous gum or a cellulose, for example, methyl cellulose or a carboxy vinyl polymer such as Carbopol.

In preparing the composition embodying the present invention, care should be observed to avoid the formation of acid in the finished dentifrice. In other words, the pH of the composition is made such that when it is added to a toothpaste, the pH of the resulting anticalculus composition will be between about 6 and 8, and, hence, not irritating to the mucous membranes. If acids are formed in such a composition or in a toothpaste containing it, they tend to attack the tooth enamels and create or aggravate caries.

As ordinarily manufactured, triethanolamine titanate contains sufficient quantities of isopropyl alcohol to confer on the composition a bitter taste which would be objectionable in a toothpaste. I have found that this taste can be minimized by the heating treatment described above in the several examples. It is unnecessary to remove all the isopropyl alcohol because the taste remaining after such heating may be masked by the addition of the customary flavoring ingredients such as Wintergreen oil, menthol and the like. Furthermore, the alcohol which is lost by evaporation during the heating specified in the foregoing examples is replaced by the addition of corresponding quantities of ethanol which has a pleasing taste and tends also to mask the taste of the isopropyl alcohol.

Having thus described this invention in such, full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. A composition of matter for use in inhibiting the deposition of calculus on natural and artificial teeth which consists of a mixture of toothpaste and an organic chemical compound, said compound having the property of forming a thin, adherent, calculus inhibiting film on the teeth when said composition is applied thereto, said compound having been made by bringing together, heating to between about 50° C. and about 100° C. and stirring until a clear liquid results, an alkyl organic compound selected from the group consisting of stearic acid, lactic acid, ricinoleic acid, sodium salts of said acids, esters of said acids and castor oil, and an organic titanate selected from the group consisting of tetra isopropyl titanate, tetra-N-butyl titanate, tetra octylene glycol titanate, triethanolamine titanate, triethanolamine titanate-N-stearate, and triethanolamine-N-oleate, mixing the said clear liquid with the toothpaste in the ratio of about 5 parts of the said organic chemical compound to about 95 parts of the toothpaste, and adjusting the pH value of the resulting composition to between about 6 and about 8.

2. The composition of matter set forth in claim 1 in which the said organic titanate is tetra-N-butyl titanate.

3. The composition of matter set forth in claim 1 in which the said organic titanate is tetra octylene glycol titanate.

4. The composition of matter set forth in claim 1 in which there is mixed with the said clear liquid pulverized particles of a polishing agent selected from the group consisting of polytetrafluoroethylene, polychlorotrifluoroethylene, tetrafluoroethylene, hexafluoropropylene, polyvinyl fluoride and vinylidene fluoride and fluorinated vinyl resin, the size of the particles ranging between about 0.02 micron and about 35 microns.

5. The composition of matter set forth in claim 1 in which the said organic titanate is titanium lactate.

6. The composition of matter set forth in claim 5 in which the said alkyl organic compound is sodium ricinoleate.

7. The composition of matter set forth in claim 1 in which the said organic titanate is tetra isopropyl titanate.

8. The composition of matter set forth in claim 7 in which the alkyl organic compound is sodium ricinoleate.

9. The composition of matter set forth in claim 7 in which the said alkyl organic compound is ricinoleic acid.

10. The composition of matter set forth in claim 8 in which the liquid and the said sodium ricinoleate are heated to between about 75° C. and about 100° C.

11. The composition of matter set forth in claim 1 in which the said organic titanate is triethanolamine titanate.

12. The composition of matter set forth in claim 11 in which the said alkyl organic compound is sodium ricinoleate.

13. The composition of matter set forth in claim 11 in which the said alkyl organic compound is ricinoleic acid.

14. The composition of matter set forth in claim 11 in which the said alkyl organic compound is palmitic acid.

15. The composition of matter set forth in claim 14 in which said liquid and the palmitic acid are heated to between about 75° C. and about 95° C.

16. The composition of matter set forth in claim 11 in which the said alkyl organic compound is castor oil.

17. The composition of matter set forth in claim 16 in which the said liquid and castor oil are heated to between about 50° C. and about 70° C.

References Cited by the Examiner

UNITED STATES PATENTS

| | | | |
|---|---|---|---|
| 2,130,034 | 9/1938 | Schmidt | 167—93 |
| 3,042,508 | 7/1962 | Haigis et al. | 51—298 |
| 3,070,510 | 12/1962 | Cooley et al. | 167—93 |
| 3,120,469 | 2/1964 | Tamas | 167—93 |

LEWIS GOTTS, *Primary Examiner.*

RICHARD L. HUFF, *Assistant Examiner.*